United States Patent
Barton et al.

(10) Patent No.: US 11,095,661 B2
(45) Date of Patent: Aug. 17, 2021

(54) ENFORCING DATA SOVEREIGNTY POLICIES IN A CLOUD ENVIRONMENT

(71) Applicant: Cisco Technology, Inc., San Jose, CA (US)

(72) Inventors: Robert Edgar Barton, Richmond (CA); Matthew William Gillies, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 261 days.

(21) Appl. No.: 16/425,520

(22) Filed: May 29, 2019

(65) Prior Publication Data

US 2020/0382519 A1 Dec. 3, 2020

(51) Int. Cl.
*H04L 29/06* (2006.01)
*H04L 29/08* (2006.01)

(52) U.S. Cl.
CPC ........ *H04L 63/107* (2013.01); *H04L 63/0823* (2013.01); *H04L 63/20* (2013.01); *H04L 67/1097* (2013.01)

(58) Field of Classification Search
CPC ... H04L 67/1097; H04L 63/20; H04L 63/107; H04L 63/0823
See application file for complete search history.

(56) References Cited

U.S. PATENT DOCUMENTS

| | | | |
|---|---|---|---|
| 9,578,017 B2 | 2/2017 | Ferguson et al. | |
| 9,781,165 B1 | 10/2017 | Prafullhandra et al. | |
| 10,033,702 B2 | 7/2018 | Ford et al. | |
| 10,261,943 B2* | 4/2019 | Narayan | G06F 16/2365 |
| 2017/0300030 A1 | 10/2017 | Berger et al. | |
| 2018/0241569 A1* | 8/2018 | Harmon | H04L 67/18 |
| 2018/0316563 A1* | 11/2018 | Kumar | H04L 41/0853 |
| 2018/0336361 A1 | 11/2018 | Gilani et al. | |
| 2019/0068725 A1* | 2/2019 | Reyes | H04L 67/148 |
| 2019/0319953 A1* | 10/2019 | Lear | H04L 63/0823 |

* cited by examiner

*Primary Examiner* — El Hadji M Sall
(74) *Attorney, Agent, or Firm* — Polsinelli PC

(57) ABSTRACT

Systems, methods, and computer-readable media for enforcing data sovereignty policies in a cloud environment are provided. An example method can include sending, by a cloud provider, to a government entity associated with a geographic area, a request for device certificates for nodes located within the geographic area; receiving device certificates for the nodes; creating a data sovereignty policy specifying that data associated with the government entity must be stored on nodes located within the geographic area; based on the device certificates, verifying those of the nodes that comply with the data sovereignty policy; and storing the data associated with the government entity on those of the nodes verified to comply with the data sovereignty policy.

20 Claims, 8 Drawing Sheets

ENFORCING DATA SOVEREIGNTY POLICIES IN A CLOUD ENVIRONMENT

TECHNICAL FIELD

The present technology pertains to enforcement of data sovereignty policies in compute environments.

BACKGROUND

The emergence of data sovereignty laws throughout the globe has created extremely difficult challenges for cloud and storage providers in the age of big data. For example, data sovereignty laws regulate how data can be processed in specific countries or territories. Data sovereignty laws typically require certain data collected or generated within a country or territory to be physically and geographically stored within that country or territory. However, tracking and validating the physical and geographic location of cloud applications and data can be extremely difficult, particularly as cloud storage is increasingly dispersed across geographic locations and disseminated in numerous locations at any given time. As a result, data sovereignty laws have created significant technical, legal, and business hurdles for cloud and other storage providers. Indeed, data sovereignty laws have created significant barriers for cloud and other storage providers who are often forced to build cloud data centers within specific countries and undertake onerous efforts to prove compliance with a wide variety of data sovereignty laws across the globe.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
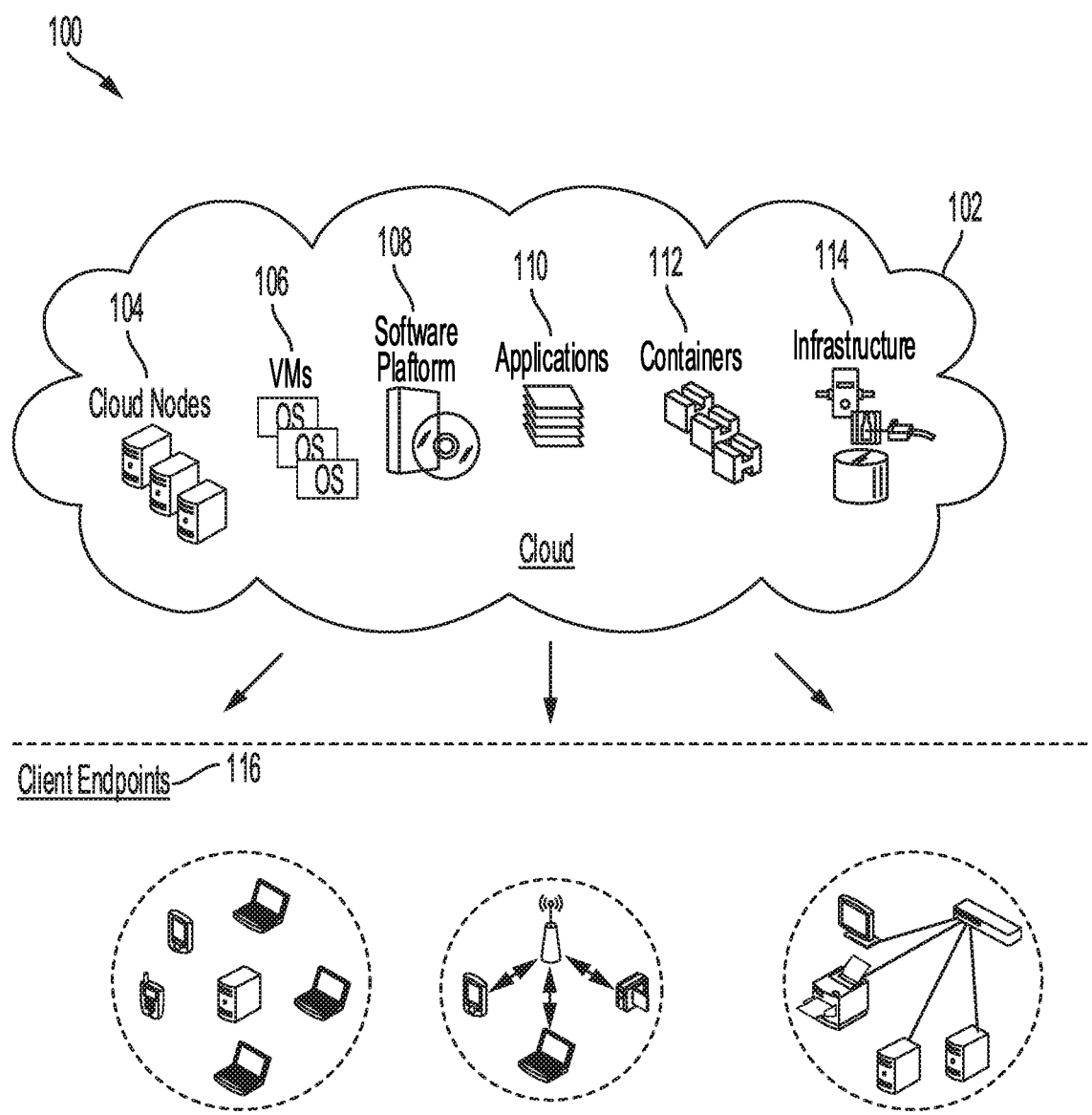
FIG. 1 illustrates an example cloud computing environment for implementing and enforcing data sovereignty policies, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed are systems, methods, and computer-readable media for enforcing data sovereignty policies in cloud environments. In some aspects, a method for enforcing data sovereignty policies in cloud environments is provided. An example method can include sending, by a cloud provider, to a government entity associated with a geographic area, a request for device certificates for a plurality of nodes physically located within the geographic area; receiving, by the cloud provider, the device certificates issued for the plurality of nodes by a trusted certificate authority; creating a data sovereignty policy for one or more customers of the cloud provider, the data sovereignty policy specifying that data associated with the government entity must be stored on nodes located within the geographic area; based on the device certificates, verifying those of the plurality of nodes that comply with the data sovereignty policy; and storing the data associated with the government entity on those of the plurality of nodes verified to comply with the data sovereignty policy.

In some aspects, a system for enforcing data sovereignty policies in cloud environments is provided. An example system can be associated with a cloud network and can include one or more processors and at least one computer-readable storage medium having stored therein instructions which, when executed by the one or more processors, cause the system to send, to a government entity associated with a geographic area, a request for device certificates for a plurality of nodes physically located within the geographic area; receive the device certificates issued for the plurality of nodes by a trusted certificate authority; creating a data sovereignty policy for one or more customers of the cloud provider, the data sovereignty policy specifying that data associated with the government entity must be stored on nodes located within the geographic area; based on the device certificates, verify those of the plurality of nodes that comply with the data sovereignty policy; and store the data associated with the government entity on those of the plurality of nodes verified to comply with the data sovereignty policy.

In some aspects, a non-transitory computer-readable storage medium for enforcing data sovereignty policies in cloud environments is provided An example non-transitory computer-readable storage medium can include instructions stored therein which, when executed by one or more processors associated with a cloud network, cause the one or more processors to send, to a government entity associated with a geographic area, a request for device certificates for a plurality of nodes physically located within the geographic area; receive the device certificates issued for the plurality of nodes by a trusted certificate authority; creating a data sovereignty policy for one or more customers of the cloud provider, the data sovereignty policy specifying that data associated with the government entity must be stored on nodes located within the geographic area; based on the device certificates, verify those of the plurality of nodes that comply with the data sovereignty policy; and store the data associated with the government entity on those of the plurality of nodes verified to comply with the data sovereignty policy.

In some aspects, the nodes in the method, system, and non-transitory computer-readable storage medium described above can include cloud server nodes and/or, cloud storage nodes. In some aspects, each device certificate can include a deployment domain identity attribute identifying a physical location of a node associated with that device certificate, a device identity attribute indicating that the device certificate is a locally significant device identifier (LDevID) certificate installed on the node during deployment, a type-model identity attribute identifying a type or model of the node, and a serial identity attribute identifying the node. Together, the deployment domain identity attribute, the device identity attribute, the type-model identity attribute, and the serial identity attribute can uniquely identify the node and the physical location of the node associated with the device certificate.

In some examples, the type-model identity attribute and the serial identity attribute can be obtained from an initial device identifier (IdevID) installed on the node at a time of manufacturing. Moreover, in some cases, verifying those of the plurality of nodes that comply with the data sovereignty policy can include determining that each node has a valid device certificate that validates that the node is located within the geographic area.

In some implementations, storing the data as described above can include deploying the data and a set of storage elements for the one or more customers only on those of the plurality of nodes verified to comply with the data sovereignty policy. The storage elements can include, for example and without limitation, a physical storage node, a physical server node, a storage controller, a storage volume, a storage device, etc.

In some cases, the data sovereignty policy can also specify that software containers used to process data or workloads associated with the government entity must be hosted on nodes located within the geographic area. Moreover, in some aspects, the method, system, and non-transitory computer-readable storage medium described above can include identifying one or more nodes available to host one or more software containers for processing data or workloads associated with the government entity; verifying, based on respective device certificates, that the one or more nodes are located within the geographic area specified by the data sovereignty policy; and after verifying that the one or more nodes are located within the geographic area, deploying the one or more software containers on the one or more nodes.

In some implementations, the method, system, and non-transitory computer-readable storage medium described above can include generating one or more audit trails of all storage elements and software containers used for the data and workloads associated with the government entity; and based on the one or more audit trails, determining whether all storage elements and software containers used for the data and workloads have been implemented or deployed in compliance with the data sovereignty policy.

The device certificates can include one or more LDevID certificates. Moreover, in some aspects, the trusted certificate authority can be associated with the government entity. For example, the trusted certificate authority can be a certificate authority owned by the government entity, a certificate authority created by the government entity, a certificate authority trusted by the government entity, a certificate authority located within the geographic area, etc.

In some cases, the request for device certificates for the plurality of nodes physically located within the geographic area can include the serial numbers of the plurality of nodes and a signed assurance that the plurality of nodes are physically within the geographic area. Further, the data sovereignty policy described above can be based on one or more data sovereignty laws issued by the government entity.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

EXAMPLE EMBODIMENTS

As previously noted, the emergence of data sovereignty laws throughout the globe has created extremely difficult challenges for cloud and storage providers in the age of big data. Data sovereignty laws regulate how data can be stored and processed in specific countries or territories. Data sovereignty laws typically require certain data collected or generated within a country or territory to be physically and geographically stored within that country or territory. However, tracking and validating the physical and geographic location of cloud applications and data can be extremely difficult, particularly as cloud storage is increasingly dispersed across geographic locations and disseminated in numerous locations at any given time. As a result, data sovereignty laws have created significant technical, legal, and business hurdles for cloud and other storage providers.

The technologies herein can provide a mechanism for ensuring that software containers, data storage, and storage resources on a cloud environment (or any other network environment) comply with applicable data sovereignty laws. Furthermore, the approaches herein provide a framework for audits to be performed to ensure that application containers and customer data are in compliance with applicable data sovereignty laws. For example, the approaches herein can use a location identity certificate stored on physical storage and server devices, such as physical server nodes, physical storage nodes, storage controllers, etc., to verify the location of application containers and storage elements used to store data and process workloads and data. The location identity certificates can be Locally Significant Device Identifier (LdevID) certificates issued by a trusted certificate authority. Cloud system components (e.g., containers, storage devices, servers, etc.) which need to be in-region can be enrolled in order to receive location identity certificates that can be installed on the cloud system components and used to validate the physical location of the cloud system components and verify compliance with data sovereignty laws.

Figure 5:
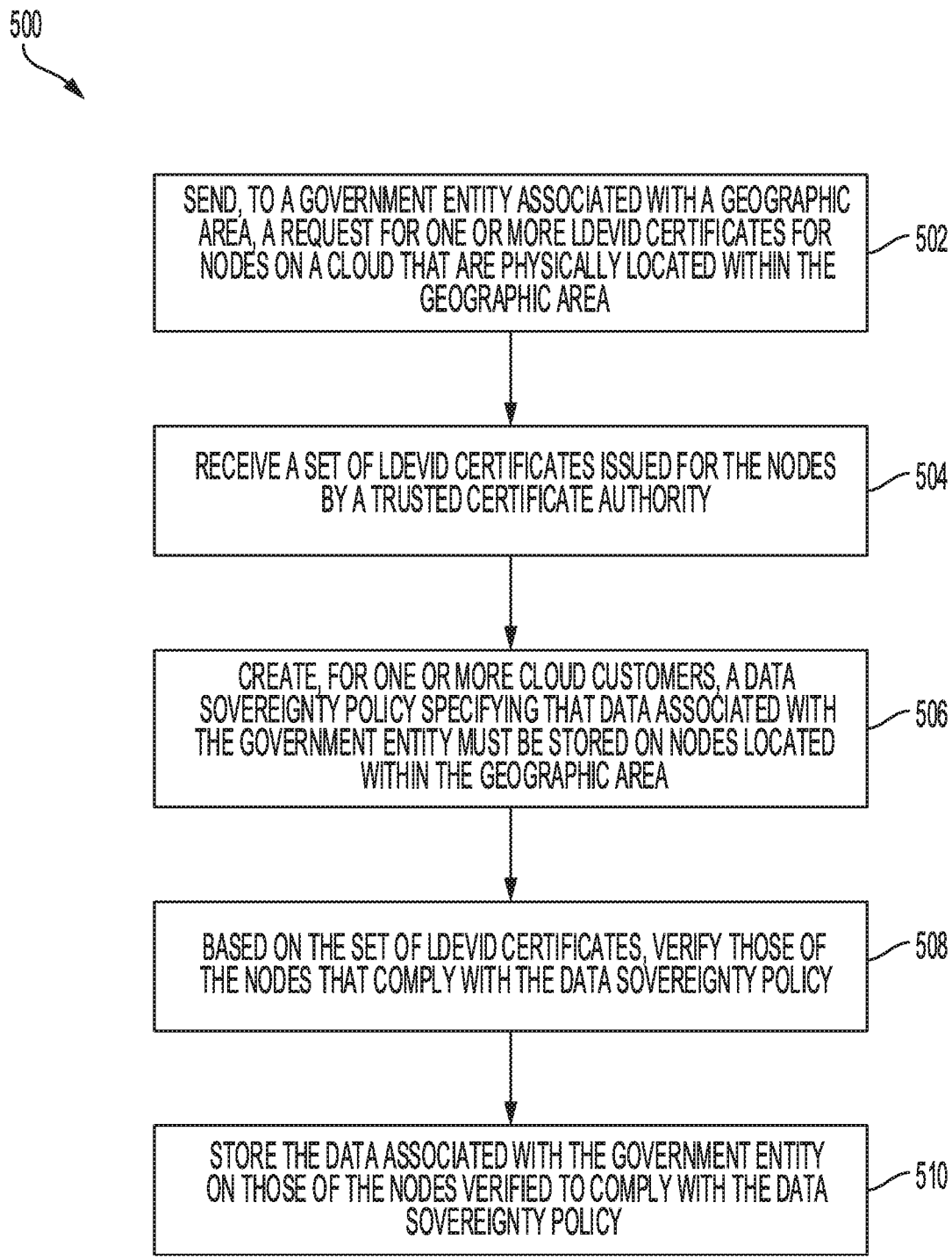
FIG. 5 illustrates an example method for enforcing data sovereignty laws in a cloud computing environment, in accordance with some examples.
Figure 6:
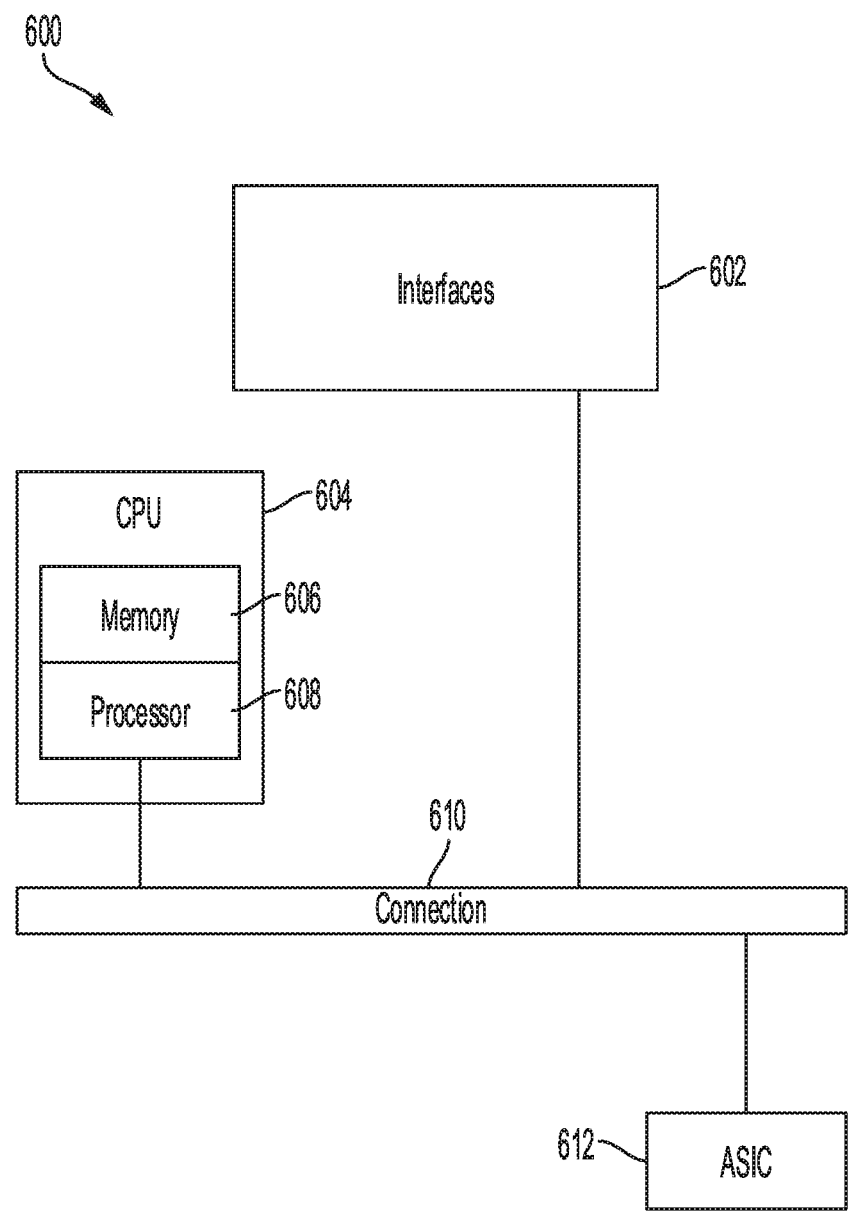
FIG. 6 illustrates an example network device in accordance with some examples.
Figure 7:
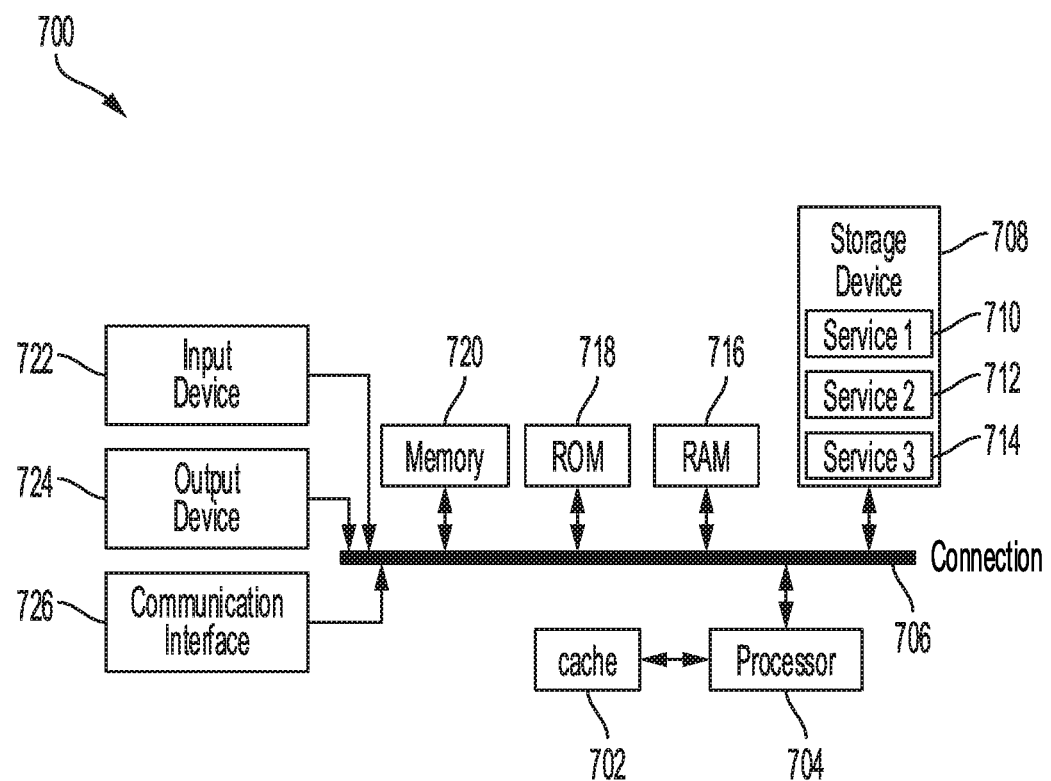
FIG. 7 illustrates an example computing device architecture in accordance with some examples.

Disclosed are systems, methods, and computer-readable media for enforcing data sovereignty policies in cloud environments. The present technologies will be described in more detail in the following disclosure as follows. The discussion begins with a description of example systems and technologies for enforcing data sovereignty policies, as illustrated in FIGS. 1 through 4. A description of an example method and techniques for enforcing data sovereignty policies in cloud environments, as illustrated in FIG. 5, will then follow. The discussion. concludes with a description of an example network device and an example computing device architecture, as illustrated in FIGS. 6 and 7, including example hardware components suitable for performing various networking and computing operations described herein.

The disclosure now turns to FIG. 1, which illustrates an example cloud computing environment 100. In this example, the cloud computing environment 100 includes a cloud 102. The cloud 102 can include one or more private clouds, one or more public clouds, and/or one or more hybrid clouds. The cloud 102 can include cloud elements 104-114. The cloud elements 104-114 can include, for example, cloud nodes 104, virtual machines (VMs) 106, software platforms 108, applications or services 110, software containers 112, and infrastructure resources 114 (e.g., storage, memory, CPU, network interfaces, etc.).

The cloud nodes 104 can include, for example, physical servers, network devices (e.g., switches, routers, controllers, etc.), storage servers, and/or other any other computing systems. The infrastructure 114 can include various types of hardware components or resources. For example, the infrastructure resources 114 can include compute resources (e.g., CPU), storage resources (e.g., storage volumes, storage controllers, storage clusters, storage devices, etc.), network resources (e.g., network interfaces, private networks, etc.), memory resources, etc.

The cloud 102 can provide cloud computing services via one or more of the cloud elements 104-114, such as cloud storage, software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application. development services, etc.), function as a service (FaaS), and other types of services such as desktop as a service (DaaS), information technology management as a service (ITaaS), managed software as a service (MSaaS), mobile backend as a service (MBaaS), etc.

For example, the cloud 102 can provide data storage services via one or more of the cloud elements 104-114. As another example, the cloud 102 can host execution environments via the cloud elements 104-114 for FaaS and serverless computing. Here, customers or developers can store functions or any code on the cloud 102 for execution at the cloud 102 via the cloud elements 104-114.

Moreover, the cloud 102 can host and manage the cloud elements 104-114, which allows specific customers or clients to avoid having to manage the infrastructure, services and/or resources used by the customers or clients and provided by the cloud 102. The client endpoints 116 can connect with the cloud 102 to obtain one or more specific services from the cloud 102. The client endpoints 116 can communicate with the cloud elements 104-114 via one or more public networks (e.g., Internet), one or more private networks, and/or one or more hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable device (e.g., a smart watch, a head-mounted display, smart glasses, etc.), a smart consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected device (e.g., smart home, smart budding, smart retail, etc.), and so forth.

Figure 2:
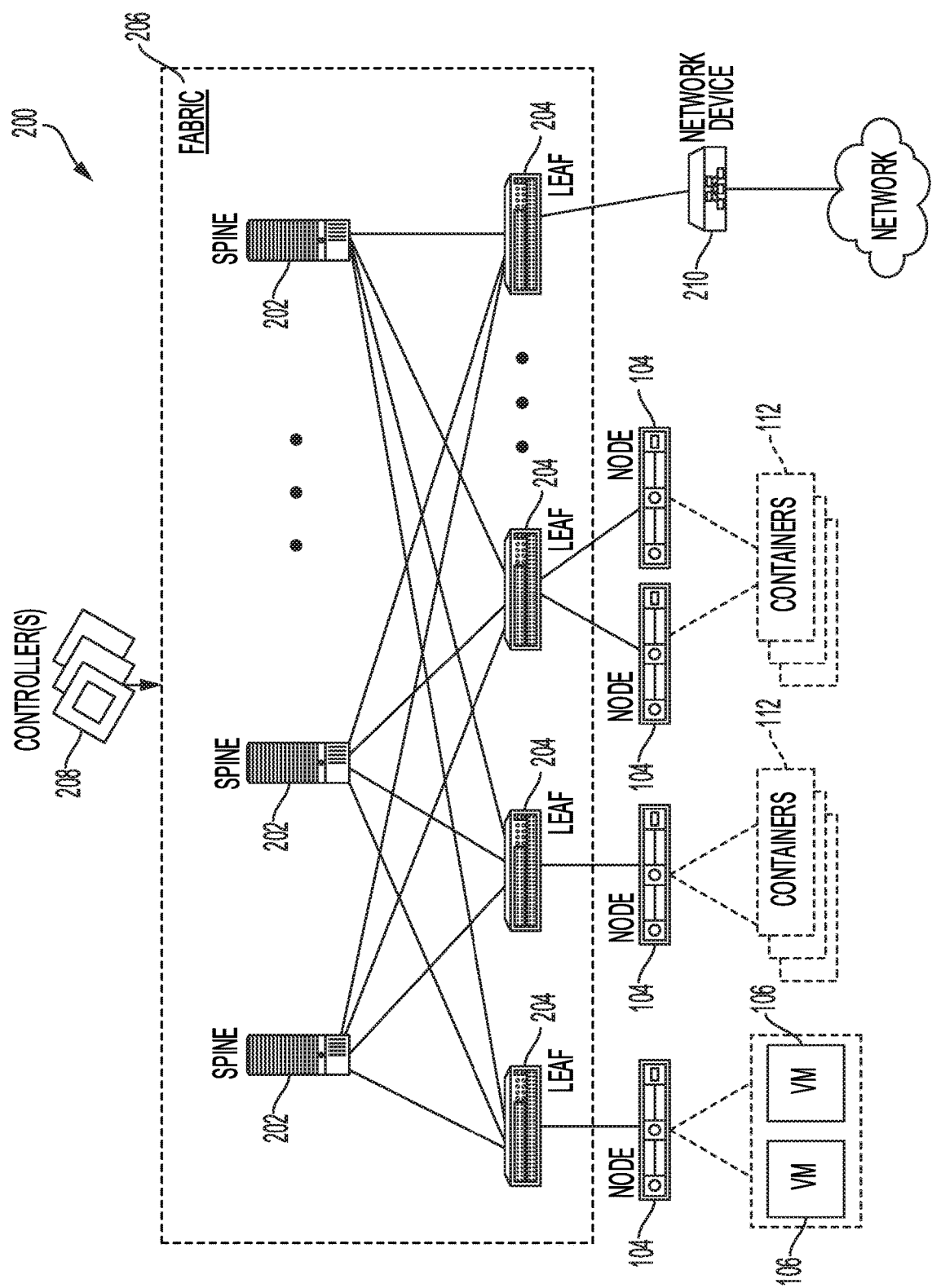
FIG. 2 illustrates a diagram of an example network architecture associated with a cloud computing environment, in accordance with some examples.

FIG. 2 illustrates a diagram of an example network architecture 200. In some examples, the network architecture 200 can correspond to a network fabric (e.g., 206) or data center hosted by the cloud 102 shown in FIG. 1. The network architecture 200 can include, a network fabric 206, which can represent the physical layer or infrastructure (e.g., underlay) of the network architecture 200. For example, in some cases, the network fabric 206 can represent a data center. The fabric 206 can include spine nodes 202 (e.g., spine switches or routers) and leaf nodes 204 (e.g., leaf switches or routers) which can be interconnected for routing or switching traffic in the fabric 206. In some examples, the spine nodes 202 and/or the leaf nodes can be implemented by one or more cloud elements 104-114, such as the cloud nodes 104 and/or the infrastructure 114 of the cloud 102 shown in FIG. 1.

The spine nodes 202 can interconnect the leaf nodes 204 in the fabric 206, and the leaf nodes 204 can connect the fabric 206 to an overlay or logical portion of the network architecture 200, which can include application services, servers, virtual machines, containers, endpoints, etc. Thus, network connectivity in the fabric 206 can flow from the spine nodes 202 to the leaf nodes 204, and vice versa. The interconnections between the leaf nodes 204 and the spine nodes 202 can be redundant (e.g., multiple interconnections) to avoid a failure in routing. In some examples, the leaf nodes 204 and the spine nodes 202 can be fully connected, such that any given leaf node is connected to each of the spine nodes 202, and any given spine node is connected to each of the leaf nodes 204.

In some cases, the leaf nodes 204 can be, for example, top-of-rack ("ToR") switches, aggregation switches, gateways, ingress and/or egress switches, provider edge devices, and/or any other type of routing or switching device. The leaf nodes 204 can be responsible for routing and/or bridging tenant or customer packets and applying network policies or rules. Network policies and rules can be driven by one or more controllers 208, and/or implemented or enforced by one or more devices, such as leaf nodes 204. The leaf nodes 204 can connect other elements to the fabric 206. For example, the leaf nodes 204 can connect the cloud nodes 104, containers 112, virtual machines (VMs) 106, network device 210, etc., with the fabric 206. In some examples, one or more of such elements can reside in one or more logical or virtual layers or networks, such as an overlay network. In some cases, the leaf nodes 204 can encapsulate and decapsulate packets to and from such elements in order to enable communications throughout network architecture 200 and the fabric 206. The leaf nodes 204 can also provide any other devices, services, tenants, or workloads with access to the fabric 206.

In some cases, the cloud nodes 104 connected to the leaf nodes 204 can similarly encapsulate and decapsulate packets to and from the leaf nodes 204. For example, the cloud nodes 104 can include one or more virtual switches or routers or tunnel endpoints for tunneling packets between an overlay or logical layer hosted by, or connected to, the cloud nodes 104 and an underlay layer represented by the fabric 206 and accessed via the leaf nodes 204. The cloud nodes 104 can include, for example, physical computing devices, such as physical servers, network devices (e.g., switches, routers, etc.), storage devices, etc., as previously explained.

The containers 112 represent software containers and can include software applications, services, appliances, functions, service chains, etc. For example, the containers 112 can include a storage service, a firewall service, a message router, a virtual switch, etc. An application can be hosted or implemented by the containers 112 or can be distributed, chained, etc. Moreover, the containers 112 can be hosted by some or all of the cloud nodes 104.

The VMs 106 can be virtual machines hosted by the cloud nodes 104. VMs 106 can include workloads running on a guest operating system on a respective node. In some cases, a VM (106) on one node (104) can be migrated to a different node (104). Nodes (104) can similarly be migrated to other locations in the network architecture 200. For example, a node connected to a leaf can be migrated to another location and/or connected to a different or additional leaf. Such configuration or deployment changes can involve modifications to settings, configurations and policies that are applied to the resources being migrated as well as other network components.

In some cases, one or more cloud nodes 104, VMs 106, and/or containers 112 can represent or reside in one or more tenant or customer spaces. A tenant or customer space can include workloads, services, applications, devices, networks, networks or routing domains (e.g., virtual routing and forwarding (VRF) domains, bridge domains (BDs), subnets, etc.) and/or resources associated with one or more clients or subscribers. Accordingly, traffic in the network architecture 200 can be routed based on specific tenant policies, agreements, configurations, etc. Moreover, addressing can vary between tenants. In some configurations, tenant spaces can be divided into logical segments and/or networks and separated from logical segments and/or networks associated with other tenants. Addressing, policy, security and configuration information between tenants can be managed by the controllers 208, the cloud nodes 104, the leaf nodes 204, etc.

Configurations in the network architecture 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through the controllers 208, which can implement or propagate such configurations through the network architecture 200. In some examples, the controllers 208 can be Application Policy Infrastructure Controllers (APICs) in an ACI framework. In other examples, the controllers 208 can be one or more management components associated with other SDN solutions, such as NSX Managers.

Such configurations can define rules, policies, priorities, protocols, attributes, objects, etc., for routing and/or classifying traffic in the network architecture 200. For example, such configurations can define attributes and objects for classifying and processing traffic based on endpoint groups (EPGs), security groups (SGs), VM types, BDs, VRFs, tenants, priorities, firewall rules, etc. Other example network objects and configurations are further described below. Traffic policies and rules can be enforced based on tags, attributes, headers, tuples, or other characteristics of the traffic, such as protocols associated with the traffic, EPGs associated with the traffic, SGs associated with the traffic, network address information associated with the traffic, etc. Such policies and rules can be enforced by one or more elements in the network architecture 200, such as leaf nodes 204, controllers 208, cloud nodes 104, etc.

In one example, the network architecture 200 can include an ACI fabric or network. ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc, Endpoints can be virtual/logical or physical devices, such as VMs, containers, hosts, or physical servers that are connected to the network architecture 200. Endpoints can have one or more attributes such as a VM name, guest OS name, a security tag, application profile, etc. Application configurations can be applied between EPGs, instead of endpoints directly, in the form of contracts. The leaf nodes 204 can classify incoming traffic into different EPGs. The classification can be based on, for example, a network segment identifier such as a VLAN ID, VXLAN Network identifier (VNID), NVGRE Virtual Subnet Identifier (VSID), MAC address, IP address, etc.

The leaf nodes 204 can associate packets with EPGs based on identifiers or attributes and enforce policies, which can be implemented and/or managed by one or more controllers 208. The leaf nodes 204 can classify to which EPG the traffic from a host belongs and enforce policies accordingly.

The network architecture 200 can deploy different hosts via the leaf nodes 204, the controllers 208, the cloud nodes 104, the containers 112, the VMs 106, etc. The network architecture 200 may interoperate with a variety of cloud nodes 104 (e.g., physical and/or virtual servers), orchestration platforms, etc. The network architecture 200 may implement a declarative model to allow its integration with application design and holistic network policy.

The controllers 208 can provide centralized access to fabric information, application configuration, resource configuration, application-level configuration modeling for a software-defined network (SDN) infrastructure, integration with management systems or servers, etc. In some cases, the controllers 208 can form a control plane that interfaces with an application plane via northbound APIs and a data plane via southbound APIs.

As previously noted, the controllers 208 can define and manage application-level model(s) for configurations in the network architecture 200. In some cases, application or device configurations can also be managed and/or defined by other components. For example, a hypervisor or virtual appliance, such as a VM or container, can run a server or management tool to manage software and services in the network architecture 200, including configurations and settings for virtual appliances.

As referenced herein, the term "hosts" can refer to cloud nodes 104 (e.g., physical or logical), containers 112, VMs 106, network devices (e.g., 204), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

The cloud computing environment 100 and network architecture 200 described above are non-limiting example network environments and architectures provided here for explanation purposes. It should be noted that other network environments and architectures are also contemplated herein. One of ordinary skill in the art will recognize in view of the disclosure that the technologies and approaches herein can apply to a wide variety of network environments and architectures.

Moreover, the following technologies and approaches will be described with reference to the cloud computing environment 100. However, it should be noted that the following technologies and approaches can be implemented in other network environments, such as non-cloud environments. The cloud computing environment 100 is used below as a non-limiting example environment provided for explanation purposes.

Figure 3A:
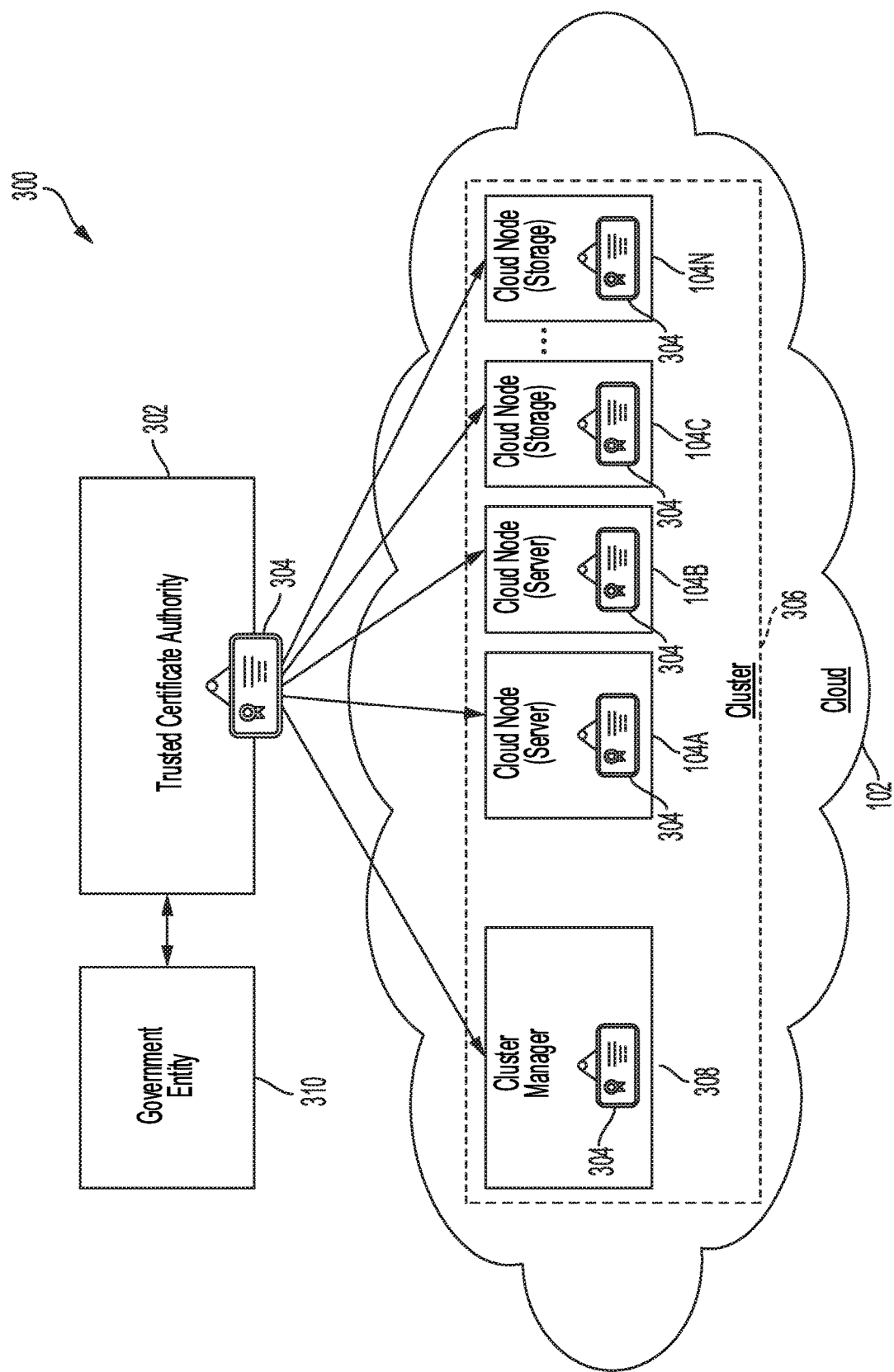
FIG. 3A illustrates an example process for tracking and validating the physical location of cloud applications and data, in accordance with some examples.

FIG. 3A illustrates an example process 300 for tracking and validating the physical location of cloud applications and data. The physical location of cloud applications and data can be tracked and validated for enforcing data sovereignty policies. In this example, a trusted certificate authority 302 can issue device certificates 304 to cloud nodes 104A-N that are physically located within a specific geographic area associated with a data sovereignty law that a cloud provider (e.g., cloud 102) wishes to enforce.

The trusted certificate authority 302 can include, for example, a public key infrastructure (PKI) and/or a certificate authority (CA) created, owned, and/or entrusted by a government entity 310 to issue device certificates to physical nodes (e.g., 104A-N) having a known or validated identity and known to be physically located within the same jurisdiction or geographic area as the government entity 310 and/or within a geographic area specified by data sovereignty laws established by the government entity 310. In some cases, the trusted CA 302 can be centrally controlled and/or located within the same jurisdiction or geographic area as the government entity 310 and/or within a geographic area specified by data sovereignty laws established by the government entity 310. For example, if the government entity 310 is a federal government of a specific country, the trusted CA 302 can be a CA trusted by the federal government of that specific country and/or located within the specific country.

The government entity 310 can be, for example, a federal government, a state government, a government agency, a municipality, a local government, an international political body or union, etc. Moreover, the geographic area can be, for example, a country, a state, a territory, a city, or any region associated with the government entity 310 and/or specified by data sovereignty laws established by the government entity 310. The device certificate can be an X.509 Locally Significant Device Identifier (LDevID) as described in the IEEE (institute of Electrical and Electronics Engineers) 802.1AR standard. The LDevID can provide local device ID and attestation credentials. As described herein, the LDevID can be used to provide a node's (and any device or component) physical location and prove that the node (e.g., 104A, 104B, 104C, 104N) is trusted by a higher authority or government (e.g., the government entity 310 and/or the trusted CA 302) to be physically within the same jurisdiction or geographic area as the government entity 310 and/or within a geographic area specified by one or more data sovereignty laws established by the government entity 310.

When the cloud 102 enrolls for the device certificate, the cloud 102 (or a cloud provider associated with the cloud 102) can provide the serial number of each of the cloud nodes 104A-N for which a device certificate from the trusted CA 302 is requested. The cloud 102 or cloud provider) can also provide a signed assurance that the each node is physically within the geographic area, As further described herein, the government entity 310 may audit the cloud 102 at any time to ensure compliance and/or to verify the signed assurance.

The trusted CA 302 can use the serial number of each node and the signed assurance to issue the device certificates 304 for specific nodes. In the example shown in FIG. 3A, the trusted CA 302 issues device certificates 304 (LDevIDs) to a cluster 306 of nodes on the cloud 102. The cluster 306 of nodes includes a cluster manager 308 and cloud nodes 104A-N. In some cases, the cluster manager 308 can be a master node responsible for maintaining a desired state for the duster 306 of nodes. For example, the cluster manager 308 can provide a frontend to the control plane associated with the cluster 306 of nodes, manage a store used for backups of cluster data, perform scheduling operations, monitor nodes and responding to problems, perform replication operations, create service accounts, create access tokens, etc.

The cloud nodes 104A-N in the cluster 306 of nodes can include, for example, physical storage nodes, physical server nodes, etc. For example, the cloud nodes 104A and 104B can represent server nodes for hosting applications, services, software containers, etc., and the cloud nodes 104C and 104N can represent storage nodes for storing data on the cloud 102. In this example, the cloud nodes 104A and 104B can in some cases include a scheduling driver or agent for making sure that containers are running and healthy, and the cloud nodes 104C and 104N can in some cases include a storage controller.

The device certificate 304 issued by the trusted CA 302 to a node (e.g., the cluster manager 308 and the cloud nodes 104A-N) can identify the specific geographic location of the node. For example, the device certificate 304 issued for the cluster manager 30$ can identify the physical location of the cluster manager 308, and the device certificates 304 issued for the cloud nodes 104A-N can each identify the physical location of an associated cloud node the device certificate 304 is issued for (e.g., the device certificate 304 for cloud node 104A can identify the physical location of cloud node 104A, the device certificate 304 for cloud node 104B can identify the physical location of cloud node 104B, the device certificate 304 for cloud node 104C can identify the physical location of cloud node 104C, and the device certificate 304 for cloud node 104N can identify the physical location of cloud node 104N).

The cluster manager 308 and the cloud nodes 104A-N can each store an associated device certificate 304 issued for it by the trusted CA 302. Since the device certificates 304 can identify the location of the cloud nodes 104A-N, the device certificates 304 can be used to validate the location of any of the cloud nodes 104A-N. Once the device certificates 304 have been issued by the trusted CA 302 and installed on the cluster manager 308 and the cloud nodes 104A-N in the cluster 306, the cloud 102 can create data sovereignty policies and deploy containers and storage elements (e.g., storage volumes) accordingly on the cloud nodes 104A-N.

Figure 3B:
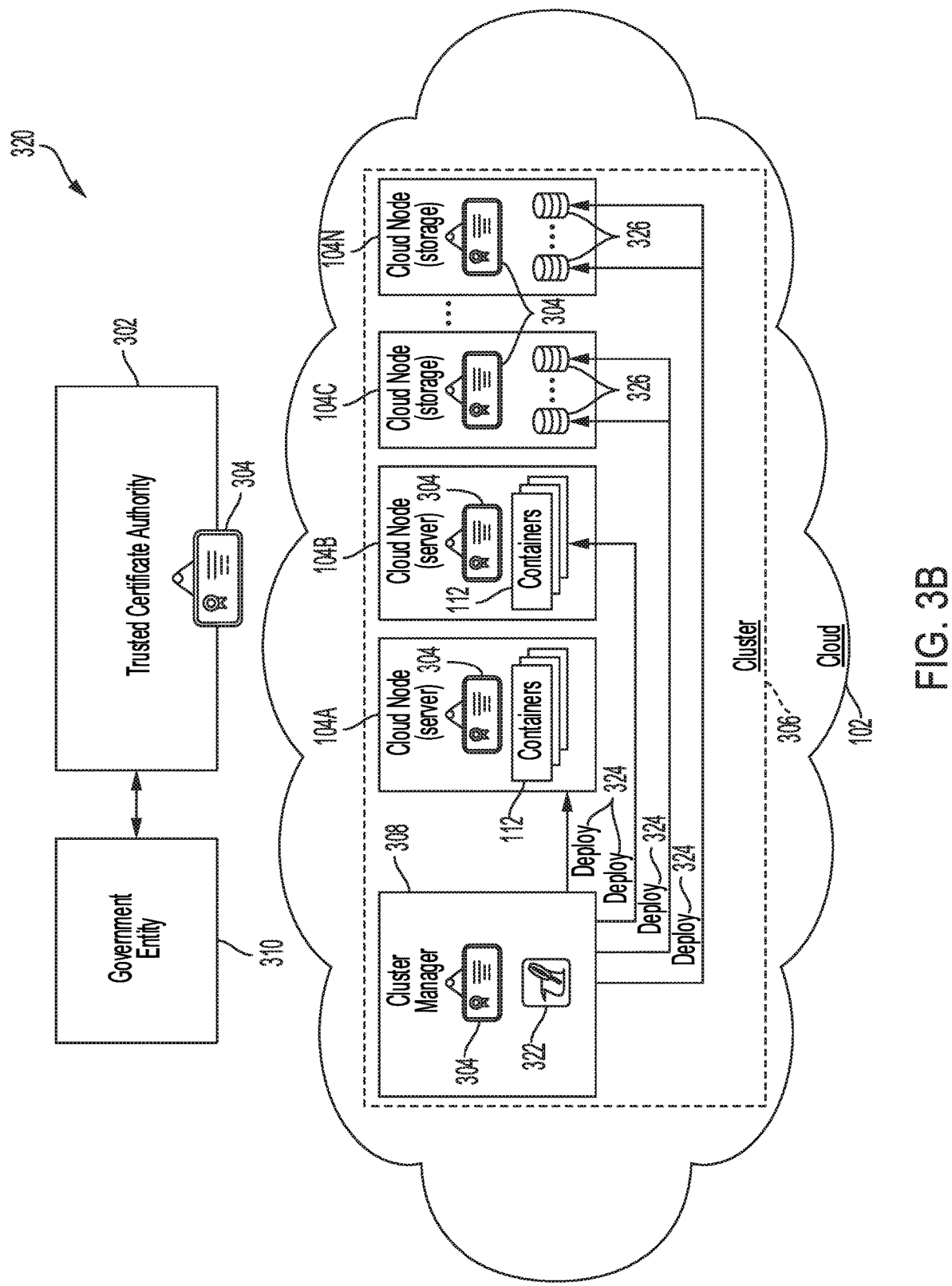
FIG. 3B illustrates an example process for creating data sovereignty policies and deploying containers and storage elements on cloud nodes, in accordance with some examples.

FIG. 3B illustrates an example process 320 for creating data sovereignty policies and deploying containers and storage elements on the cloud nodes 104A-N. Here, data sovereignty policies 322 are created on the cluster manager 308 for specific customers. For example, a data sovereignty policy 322 can be created on the cluster manager 308 for the U.S. Government which provides that all data storage and container nodes on the cloud 102 used for or by the U.S. Government must be physically located within the U.S. As another example, a data sovereignty policy 322 can be created for another government which provides that workloads and storage for that government must remain physically within the European Union.

When the cluster manager 308 wants or needs to deploy 324 software containers 112 and storage volumes 326, the cluster manager 308 can check an inventory of available nodes on the cloud 102 to identify cloud nodes 104A-N that comply with the data sovereignty policy 322. The cluster manager 308 can review device certificates 304 on cloud nodes 104A-N to ensure the cloud nodes 104A-N comply with the data sovereignty policy 322. When selecting nodes on the cloud 102 for deploying software containers 112 and storage volumes 326, the cluster manager 308 may only select those cloud nodes 104A-N that have a valid device certificate 304 (e.g., a valid LDevID certificate) that indicates that the location of such nodes complies with the data sovereignty policy 322. This can ensure that when the cloud 102 deploys software containers 112 and storage volumes 326 for a customer, the data sovereignty policy 322 associated with that customer is adhered to at all times.

This approach can also enable the cloud provider to produce audit trails of all or any of the software containers (112) and storage volumes (326) that have been used or deployed for each customer. The cloud provider can use such audit trails to prove that the software containers (112) and storage volumes (326) have been deployed in accordance with the data sovereignty policy (322).

The cloud 102 can implement one or more data sovereignty policies for a cloud customer. For example, the cloud 102 can implement a single data sovereignty policy for a customer or multiple data sovereignty policies for that customer. In some cases, the cloud 102 can implement multiple data sovereignty policies for multiple customers. Moreover, in some cases, the cloud 102 can implement a single data sovereignty policy that applies to multiple customers.

In some implementations, the cloud 102 may enroll all of its cloud nodes 104 for data sovereignty policy enforcement as described herein. However, in some cases, the cloud 102 may not need to enroll an its cloud nodes 104 as described herein. For example, in the private sector, data sovereignty is not typically an issue. Thus, the cloud 102 may not need to enroll all of its cloud nodes 104 for data sovereignty policy enforcement as described herein. However, in some cases, a certain number of compute and storage nodes may still be included in this enrollment to serve customers in the public sector.

In some cases, the approaches herein can make the deployment of containers and storage more deterministic, as only nodes and storage volumes that comply with a data sovereignty policy may be used within the duster 306 on a per-customer basis.

Figure 4:
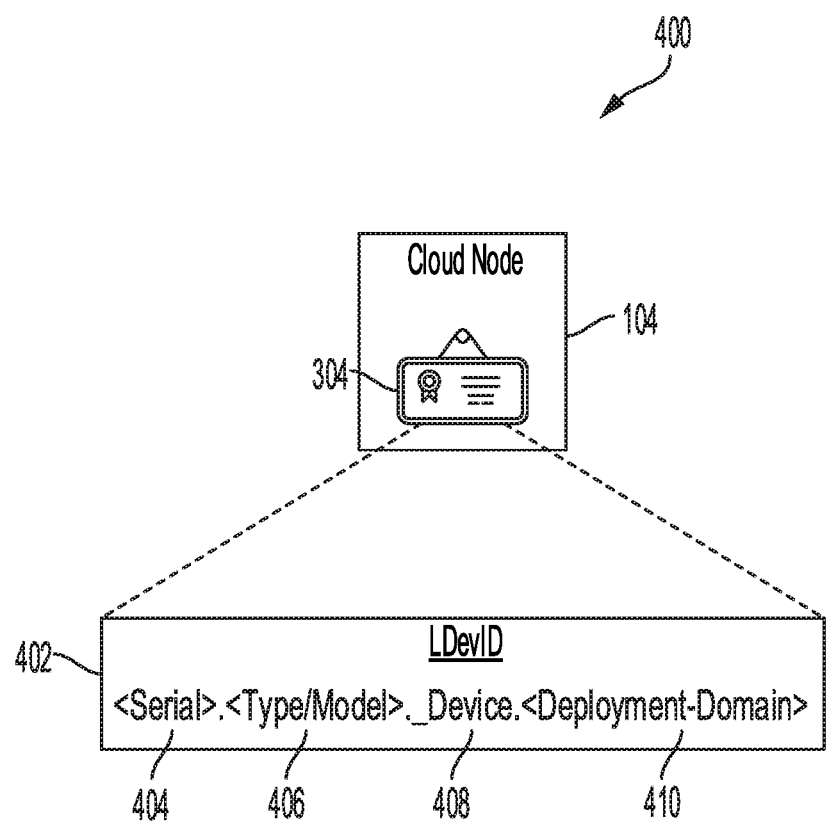
FIG. 4 illustrates an example format of a locally significant device identifier (LDevID) certificate identifier (ID) corresponding to a device certificate for a cloud node, in accordance with some examples.

FIG. 4 illustrates an example format 400 of an LDevID certificate identifier (ID) 402 corresponding to a device certificate 304 for a cloud node 104. In this example, the device certificate 304 is an LDevID certificate and includes an LDevID certificate ID 402. The LDevID certificate ID 402 can include metadata 404-410 for identifying or validating the identity and physical location of an associated node (104). The metadata 404-410 can include a serial identity attribute 404, a type/model identity attribute 406, a device identity attribute 408, and a deployment domain identity attribute 410.

The serial identity attribute 404 can uniquely identify the device, and can be obtained from an Initial Device Identifier (IDevID) installed on the device at the time of manufacturing. In some examples, the IDevID can be a secure X.509 certificate as described in the IEEE 802.1AR standard.

The type/model identity attribute 406 can identify the type and/or model of the device, and can similarly be obtained from an IDevID installed on the device at the time of manufacturing.

The device identity attribute 408 can be a keyword or metadata indicating that the device certificate 304 (e.g, the LDevID certificate) is an LDevID certificate installed during a live deployment.

The deployment domain identity attribute 410 can identify a domain used by the owner of the device. However, in some cases, the deployment domain identity attribute 410 may have to follow a format of the issuing government authority, such as US-NEW-YORK, CANADA-QUEBEC, EU-GERMANY, to identify the physical location of the device. In some examples, the location can identify a region and a subregion. For example, the location can identify both the country and the province or state where the device is located.

Together, the serial identity attribute 404, the type/model identity attribute 406, the device identity attribute 408, and the deployment domain identity attribute 410 in the LDevID certificate ID 402 can uniquely identify the device and its physical location. This way, the device certificate 304 can be used to identify, validate, and/or prove the identity and location of the device having the device certificate 304.

Having described example systems and technologies, the disclosure now turns to the method 500 for enforcing data sovereignty policies in a cloud environment, as illustrated in FIG. 5. The steps outlined herein are examples and can be implemented in any combination thereof, including combinations that exclude, acid, or modify certain steps.

At step 502. a cloud provider (e.g., cloud 102) can send, to a government entity (310) associated with a geographic area, a request for device certificates (304) for nodes (104) physically located within the geographic area. In some examples, the request can include the serial numbers of the nodes (104) for which device certificates (304) are being requested and a signed assurance that the nodes (104) are physically within the geographic area.

The device certificates (304) can be LDevID certificates, as previously explained. Moreover, the geographic area can be, for example and without limitation, a country, a state, a province, a city, a group of countries, a region, a territory, a jurisdiction and/or any other geographic area.

At step 504, the cloud provider (e.g., cloud 102) can receive device certificates (304) issued for the nodes (104) by a trusted certificate authority (302). The device certificates (304) can then be deployed or installed on the nodes (104) for use in validating or verifying the location of the nodes (104) as described herein. For example, in some cases, the device certificates (304) can be installed on one or more hardware components of the nodes (104) and/or on one or more software components installed on one or more hardware components of the nodes (104). To illustrate, the device certificates (304) can be installed on a storage controller on the nodes (104), a driver installed on a hardware component of the nodes (104), a secure or isolated memory (or portion of memory) on the nodes (104), etc.

In some examples, each device certificate (304) can include an LDevID certificate ID (402) containing a serial identity attribute (404) identifying a node associated with the device certificate (304), a type-model identity attribute (406) identifying a type and/or model of the node, a device identity attribute (408) indicating that the device certificate (304) is an LDevID certificate installed on the node during deployment, and a deployment domain identity attribute (410) identifying a domain and/or physical location of the node. Together, the serial identity attribute (404), the type-model identity attribute (406), the device identity attribute (408), and the deployment domain identity attribute (410) in a device certificate can uniquely identify the node and physical location of the node associated with that device certificate.

In some cases, information in the LDevID certificate ID (402) can be obtained from IDevIDs installed on the nodes (104). For example, in some cases, the serial identity attribute (404) and the type-model identity attribute (406) can be obtained from an IDevID installed on the nodes (104) at the time of manufacturing. Moreover, the trusted certificate authority (302) can be, for example and without limitation, a certificate authority owned by the government entity (310), a certificate authority created by the government entity (310), a certificate authority trusted by the government entity (310), a certificate authority located within the geographic area, etc.

At step 506, the cloud provider (e.g., cloud 102) can create a data sovereignty policy (322) specifying that data associated with the government entity (310) must be stored on nodes (104) located within the geographic area. In some implementations, the data sovereignty policy (322) can be created on a cluster manager (308) on the cloud (102) associated with the cloud provider. Moreover, in some cases, the data sovereignty policy (322) can be created for one or more customers of the cloud provider (e.g., one or more customers or subscribers of cloud 102).

The data sovereignty policy (322) can be based on one or more data sovereignty laws established by the government entity (310). For example, if the government entity (310) enacts a law requiring data used or owned by the government entity (310); certain types of data created, processed, or used within the geographic area; and data owned by a party within the geographic area must be stored within the geographic area, the cloud provider (e.g., cloud 102) can create a data sovereignty policy (322) providing that such data must be stored on nodes (104) in the cloud (102) that are physically located within the geographic area, in accordance with the law enacted by the government entity (310).

Moreover, in some cases, the data sovereignty policy (322) can be created for all customers of the cloud provider or one or more specific customers of the cloud provider. For example, the data sovereignty policy (322) can be a universal policy applicable to all customers of the cloud provider which provides that the data defined in the law enacted by the government entity (310) in the previous example must be stored within the geographic area. As another example, in some cases, the data sovereignty policy (322) can instead apply to one or more specific customers of the cloud provider, such as a public sector customer, a customer located in or doing business out of the geographic area, a customer that uses data that falls within the law enacted by the government entity (310), etc.

In some cases, a customer can be assigned to, or associated with, a specific data sovereignty policy (or policies) created or tailored for that customer based on the applicable law(s) provided by the government entity (310) and any other factors associated with the customers, such as customer location, type of customer entity, type of data used by the customer, QoS requirements associated with that customer, other service or data sovereignty requirements associated with that customer, etc. This would allow the cloud provider to, for example, enforce and manage data sovereignty policies for that customer while also having the option to take into account other customer factors or conditions when implementing or managing such data sovereignty policies for that customer.

Based on the device certificates (304), at step 508, the cloud provider (e.g., cloud 102) can verify those of the nodes (104) that comply with the data sovereignty policy (322). For example, the cloud provider can examine the device certificates (304) installed on nodes (104) on the cloud (102) to verify the location and identity of the various nodes and verify those nodes that comply with the data sovereignty policy based on their verified location. In some cases, the cloud provider can check a current inventory of available nodes that comply with the data sovereignty policy (322) to identify those nodes that comply with the data sovereignty policy. The cloud provider can also check or validate the location of those nodes in the inventory of available nodes that comply with the data sovereignty policy (322), based on their respective device certificates (304) in order to verify or validate that those nodes comply with the data sovereignty policy (322).

In some examples, verifying those of the nodes (104) that comply with the data sovereignty policy (322) can include determining that each node has a valid device certificate (304) that validates that the node (104) is located within the geographic area. For example, the cloud provider can check the device certificates (304) on the nodes (104) to verify they are valid and verify that the physical location of the nodes (104), as identified in the device certificates (304), is indeed within the geographic area.

At step 510, the cloud provider (e.g., cloud 102) can store the data associated with the government entity (310) on those of the nodes (104) verified to comply with the data sovereignty policy (322). The data associated with the government entity (310) in this context can include data subject to the data sovereignty policy (322) and the data sovereignty law(s) enacted by the government entity (310) and used to create the data sovereignty policy (322).

For example, the government entity (310) may enact a data sovereignty law requiring data used or owned by the government entity (310); certain types of data created, processed, or used within the geographic area; and data owned by a party within the geographic area must be stored within the geographic area. The cloud provider (e.g., cloud 102) can create the data sovereignty policy (322) based on such data sovereignty law, to require storage of data within the scope of the data sovereignty law to be stored within the geographic area as provided by the data sovereignty law. The data associated with the government entity (310) in step 510 can thus include any data subject to the data sovereignty policy (322) (and consequently the data sovereignty law enacted by the government entity), such as data used or owned by the government entity (310); certain types of data created, processed, or used within the geographic area: and data owned by a party within the geographic area must be stored within the geographic area.

In some cases, the data can be stored on storage hosted, provided, or implemented by those of the nodes (104) verified to comply with the data sovereignty policy (322). For example, the data can be stored on physical and/or logical/virtual storage elements on the nodes (104), such as physical and/or logical/virtual storage volumes, disks, units, devices, and/or any other type of storage structure. In some implementations, storing the data at step 510 can include deploying the data and a set of storage elements (e.g., storage volumes, disks, units, devices, or any other type of storage structure) for one or more customers only on those of the nodes (104) verified to comply with the data sovereignty policy (322).

In some cases, the data sovereignty policy (322) can also specify that software containers (112) used to process data or workloads associated with the government entity (310) must be hosted or reside on nodes (104) located within the geographic area. To enforce the data sovereignty policy (322) in such examples, the cloud provider (e.g., cloud 102) can identify one or more nodes available to host one or more software containers (112) for processing data or workloads associated with the government entity (310); verify, based on respective device certificates (304), that the one or more nodes (104) are located within the geographic area specified by the data sovereignty policy (322); and after verifying that the one or more nodes (104) are located within the geographic area, deploy the one or more software containers (112) on the one Of more nodes (104).

The cloud provider can also use the device certificates (304) to generate audits to prove compliance with data sovereignty laws of the government entity (310). For example, the cloud provider can generate one or more audit trails of all storage elements (e.g., storage volumes, etc.) and software containers (e.g., on the nodes) used for the data and workloads associated with the government entity and, based on the one or more audit trails, determine whether all storage elements and software containers used for the data and workloads have been implemented or deployed in compliance with the data sovereignty policy (322).

The disclosure now turns to FIGS. 6 and 7, which illustrate example network devices and computing devices, such as switches, routers, client devices, endpoints, servers, and so forth.

FIG. 6 illustrates an example network device 600 suitable for performing switching, routing, and other networking operations. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 can accomplish these functions under the control of software including an operating system and any appropriate applications software. CPU 604 may include one or more processors 608, such as a processor from the INTEL X96 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among, the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, PUS interfaces, FDDI interfaces, WWI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in EEG. 6 is one specific network. device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC) 612, which can be configured to perform routing and/or switching operations. The ASIC 612 can communicate with other components in the network device 600 via the connection 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 706, such as a bus. Exemplary system 700 includes a processing unit (CPU or processor) 704 and a system connection 706 that couples various system components including the system memory 720, such as read only memory (ROM) 718 and random access memory (RAM) 716, to the processor 704. The system 700 can include a cache 702 of high-speed memory connected directly with, in close proximity to, or integrated as part of the processor 704. The system 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing device 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing device 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704 connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors, Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can he distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    sending, by a cloud provider, to a government entity associated with a geographic area, a request for device certificates for a plurality of nodes physically located within the geographic area;
    receiving, by the cloud provider, the device certificates issued for the plurality of nodes, the device certificates being issued by a trusted certificate authority, each device certificate comprising a deployment domain identity attribute identifying a physical location of a node associated with that device certificate, a device identity attribute indicating that the device certificate is a locally significant device identifier (LDevID) certificate installed on the node during deployment, a type-model identity attribute identifying a type or model of the node, and a serial identity attribute identifying the node;
    creating a data sovereignty policy for one or more customers of the cloud provider, the data sovereignty policy specifying that data associated with the government entity be stored on nodes located within the geographic area;
    based on the device certificates, verifying those of the plurality of nodes that comply with the data sovereignty policy; and
    storing the data associated with the government entity on those of the plurality of nodes verified to comply with the data sovereignty policy.

2. The method of claim 1, wherein the type-model identity attribute and the serial identity attribute are obtained from an initial device identifier (IdevID) installed on the node at a time of manufacturing.

3. The method of claim 1, wherein verifying those of the plurality of nodes that comply with the data sovereignty policy comprises determining that each node has a valid device certificate that validates that the node is located within the geographic area.

4. The method of claim 1, wherein storing the data comprises deploying the data and a set of storage elements for the one or more customers only on those of the plurality of nodes verified to comply with the data sovereignty policy, the set of storage elements comprising at least one of a physical storage node, a storage controller, and a storage volume.

5. The method of claim 4, wherein the data sovereignty policy specifies that software containers used to process data or workloads associated with the government entity be hosted on nodes located within the geographic area.

6. The method of claim 5, further comprising:
    identifying one or more nodes available to host one or more software containers for processing data or workloads associated with the government entity;
    verifying, based on respective device certificates, that the one or more nodes are located within the geographic area specified by the data sovereignty policy; and
    after verifying that the one or more nodes are located within the geographic area, deploying the one or more software containers on the one or more nodes.

7. The method of claim 6, further comprising:
    generating one or more audit trails of storage elements and software containers used for the data and workloads associated with the government entity; and
    based on the one or more audit trails, determining whether the storage elements and software containers used for the data and workloads have been implemented or deployed in compliance with the data sovereignty policy.

8. The method of claim 1, wherein the deployment domain identity attribute, the device identity attribute, the type-model identity attribute, and the serial identity attribute uniquely identify the node and the physical location of the node.

9. The method of claim 1, wherein the trusted certificate authority is associated with the government entity, wherein the device certificates comprise one or more LDevID certificates, and wherein the trusted certificate authority is at least one of a certificate authority owned by the government entity, a certificate authority created by the government entity, a certificate authority trusted by the government entity, and a certificate authority located within the geographic area.

10. The method of claim 1, wherein the request comprises serial numbers of the plurality of nodes and a signed assurance that the plurality of nodes are physically within the geographic area, and wherein the data sovereignty policy is based on one or more data sovereignty laws issued by the government entity.

11. A system comprising:
    one or more processors; and
    a computer-readable storage medium having stored therein instructions which, when executed by the one or more processors, cause the system to:
        send, to a government entity associated with a geographic area, a request for device certificates for a plurality of nodes physically located within the geographic area, the plurality of nodes being hosted by a cloud network associated with the system;
        receive the device certificates issued for the plurality of nodes, the device certificates being issued by a trusted certificate authority, each device certificate comprising a deployment domain identity attribute identifying a physical location of a node associated with the device certificate, a device identity attribute indicating that the device certificate is a locally significant device identifier (LDevID) certificate installed on the node during deployment, a type-model identity attribute identifying a type or model of the node, and a serial identity attribute identifying the node;

create a data sovereignty policy for one or more customers of the cloud network, the data sovereignty policy specifying that data associated with the government entity be stored on nodes located within the geographic area;

based on the device certificates, verify those of the plurality of nodes that comply with the data sovereignty policy; and store the data associated with the government entity on those of the plurality of nodes verified to comply with the data sovereignty policy.

12. The system of claim 11, wherein the type-model identity attribute and the serial identity attribute are obtained from an initial device identifier (IdevID) installed on the node at a time of manufacturing.

13. The system of claim 11, wherein verifying those of the plurality of nodes that comply with the data sovereignty policy comprises determining that each node has a valid device certificate that validates that the node is located within the geographic area.

14. The system of claim 11, wherein storing the data comprises deploying the data and a set of storage elements for the one or more customers only on those of the plurality of nodes verified to comply with the data sovereignty policy, the set of storage elements comprising at least one of a physical storage node, a storage controller, and a storage volume.

15. The system of claim 14, wherein the data sovereignty policy specifies that software containers used to process data or workloads associated with the government entity be hosted on nodes located within the geographic area, and wherein the computer-readable storage medium stores instructions which, when executed by the one or more processors, cause the system to:

identify one or more nodes available to host one or more software containers for processing data or workloads associated with the government entity;

verify, based on respective device certificates, that the one or more nodes are located within the geographic area specified by the data sovereignty policy; and after verifying that the one or more nodes are located within the geographic area, deploying the one or more software containers on the one or more nodes.

16. The system of claim 15, wherein the computer-readable storage medium stores instructions which, when executed by the one or more processors, cause the system to:

generate one or more audit trails of storage elements and software containers used for the data and workloads associated with the government entity; and based on the one or more audit trails, determine whether the storage elements and software containers used for the data and workloads have been implemented or deployed in compliance with the data sovereignty policy.

17. The system of claim 11, wherein the request comprises serial numbers of the plurality of nodes and a signed assurance that the plurality of nodes are physically within the geographic area, wherein the data sovereignty policy is based on one or more data sovereignty laws issued by the government entity, and wherein the device certificates comprise one or more LDevID certificates.

18. A non-transitory computer-readable storage medium comprising:

instructions stored therein which, when executed by one or more processors, cause the one or more processors to:

send, to a government entity associated with a geographic area, a request for device certificates for a plurality of nodes physically located within the geographic area, the plurality of nodes being hosted by a cloud network;

receive the device certificates issued for the plurality of nodes, the device certificates being issued by a trusted certificate authority, each device certificate comprising a deployment domain identity attribute identifying a physical location of a node associated with that device certificate, a device identity attribute indicating that the device certificate is a locally significant device identifier (LDevID) certificate installed on the node during deployment, a type-model identity attribute identifying a type or model of the node, and a serial identity attribute identifying the node;

create a data sovereignty policy for one or more customers of the cloud network, the data sovereignty policy specifying that data associated with the government entity be stored on nodes located within the geographic area;

based on the device certificates, verify those of the plurality of nodes that comply with the data sovereignty policy; and store the data associated with the government entity on those of the plurality of nodes verified to comply with the data sovereignty policy.

19. The non-transitory computer-readable storage medium of claim 18, wherein storing the data comprises deploying the data and a set of storage elements for the one or more customers only on those of the plurality of nodes verified to comply with the data sovereignty policy, wherein verifying those of the plurality of nodes that comply with the data sovereignty policy comprises determining that each node has a valid device certificate that validates that the node is located within the geographic area, and wherein the set of storage elements comprises at least one of a physical storage node, a storage controller, and a storage volume.

20. The non-transitory computer-readable storage medium of claim 19, wherein the data sovereignty policy specifies that software containers used to process data or workloads associated with the government entity must be hosted on nodes located within the geographic area, the non-transitory computer-readable storage medium comprising instructions which, when executed by the one or more processors, cause the one or more processors to:

identify one or more nodes available to host one or more software containers for processing data or workloads associated with the government entity;

verify, based on respective device certificates, that the one or more nodes are located within the geographic area specified by the data sovereignty policy; and after verifying that the one or more nodes are located within the geographic area, deploy the one or more software containers on the one or more nodes.

* * * * *